March 16, 1971    W. K. SCHIMMEYER ET AL    3,570,074

ROPE END FITTING

Filed Nov. 12, 1968

WITNESSES
Helen M. Farkas
James T. Young

INVENTORS
Werner K. Schimmeyer &
Paul G. Bettinger
BY
Frank Costanzo Jr.

United States Patent Office 3,570,074
Patented Mar. 16, 1971

3,570,074
ROPE END FITTING
Werner K. Schimmeyer, Sunnyvale, Calif., and Paul G. Bettinger, Spokane, Wash., assignors to Westinghouse Electric Corporation, Pittsburgh, Pa.
Filed Nov. 12, 1968, Ser. No. 774,937
Int. Cl. F16g *11/05*
U.S. Cl. 24—123       2 Claims

ABSTRACT OF THE DISCLOSURE

An improved rope end fitting structure, attached to the end portion of a rope for assuming the tensile load on the rope in use, comprises a tubular sleeve having a convoluted frusto-conical inner surface encompassing an end portion of the rope and filled with a potting resin. The rope end portion is frayed or unraveled and splayed to a larger diameter and embedded in the resin, and a convoluted tapering pin is inserted in the end of the rope, thereby providing an arrangement in which the sleeve and the embedded rope end have a maximum tensile strength at least equal to the maximum tensile strength of the rope.

BACKGROUND OF THE INVENTION

The present invention relates to rope fittings employed to anchor a rope end to a stationary or movable member, and is especially useful in winch cable construction, guy line arrangements and cargo handling equipment. In this field, the rope end is connected to a metal fitting which, in turn, is anchored and holds the rope during application of tensile loads thereon. Accordingly, the connection between the rope end and the fitting is a determining factor in the load that the rope can safely support. Ideally, the connection between the rope end and fitting should be capable of withstanding a tensile stress at least equal to the tensile strength of the rope.

Many arrangements have heretofore been proposed and employed with varying degrees of success. Some have been suitable for use with ropes made of mineral fibers, such as sisal, hemp and cotton. Others have been suitable for use with ropes made of synthetic fibers.

It is an object of this invention to provide an improved rope end fitting arrangement that is compact, readily fabricated, provides a connection that is at least as strong as the tensile strength of the rope and that can be employed with ropes made of either synthetic or natural fibers.

BRIEF SUMMARY OF THE INVENTION

In accordance with the invention, there is provided a highly improved, yet simple rope end fitting structure that may be anchored to any suitable device and is effective to assume the tensile load on the rope up to the breaking stress on the rope.

The invention is primarily useful with ropes made of fibrous material and comprises a tubular metal sleeve member encompassing the rope end portion and filled with a potting resin cured in situ to form the connection between the rope end and the metal sleeve member. The metal sleeve may be provided with any suitable anchoring means such as an eyelet to facilitate anchoring.

The sleeve member has a bore defined by an inner wall surface of converging shape and the fibers in the end portion of the rope are frayed, i.e. loosened and spread or splayed outwardly to form a divergent end portion generally complementary to the convergent sleeve bore.

The splayed end portion of the rope is disposed in the bore and embedded in a potting resin that substantially fills the bore to form a hard coherent composite mass that is bonded to both the rope fibers and the sleeve.

A tapered pin is preferably inserted into the end portion of the rope to maintain the splayed relation of the fibers during fabrication.

Accordingly there is provided an integrated structure of exceptional strength.

The bore and the pin may be provided with circular convolutions to add strength in shear to the structure and the tapered pin is preferably provided with a head portion of sufficient size to abut the end wall of the sleeve, for even further strength.

THE DRAWING

The invention, and the objects and advantages thereof, will be better understood upon consideration of the following detailed description read in connection with the accompanying drawings in which.

PREFERRED EMBODIMENT

Figure 1:
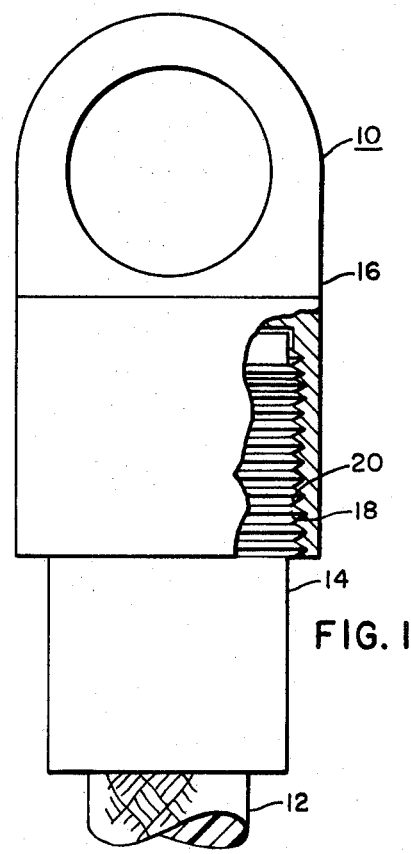
FIG. 1 is an elevational view, with portions in section, of a rope end fitting structure embodying the invention.
Figure 2:
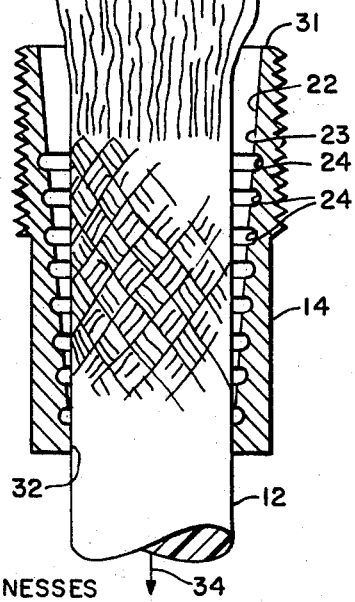
FIG. 2 is a longitudinal sectional view of the structure shown in FIG. 1 but with the anchoring eyelet member omitted.
Figure 2:
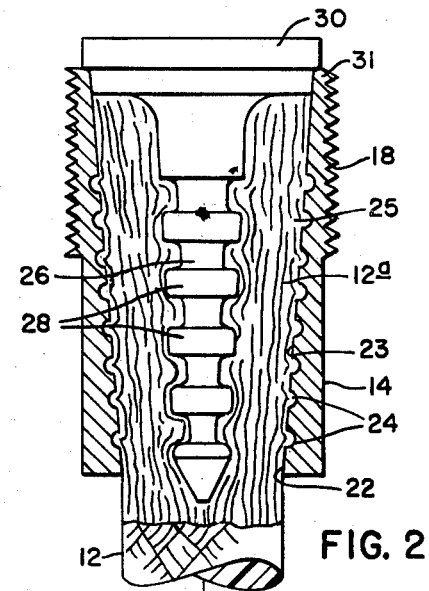

Referring to the drawings in detail, in FIG. 1 there is shown a rope end fitting structure, generally designated 10, formed in accordance with the invention. This structure comprises a rope 12 having an end portion 12a (FIG. 2) received in a tubular sleeve member 14 and integrally connected thereto, as will subsequently be described.

The sleeve member 14 is connected to a suitable securing or anchoring member 16 in any suitable manner, for example by external threads 18 formed on the sleeve member and mating internal threads 20 formed on the anchoring member.

The sleeve member 14 is provided with an internal bore 22 having an inner wall surface 23 of smoothly convergent shape, preferably frusto-conical, with a plurality of longitudinally spaced circular recessed convolutions 24.

The end portion 12a of the rope is encompassed by the sleeve member 14 and embedded therein by a suitable quantity of potting resin 25, cured in situ to provide an integral bonded connection between the fibrous strands of the rope end 12a and the sleeve member.

There is further provided a tapered pin 26 disposed in a central axially extending position within the rope end portion 12a, effective to spread or splay the rope strands into tight abutment with the inner wall surface 23 of the sleeve. The pin 26 is provided with a plurality of longitudinally spaced projecting convolutions 28 to enhance the locking and bonding effects of the resin upon the pin. The pin is also provided with an enlarged head portion 30 of disc shape abutting the large diameter end portion 31 of the sleeve member and acting as an enclosure for the rope end, and has a frusto-conical shoulder portion 32 of reduced diameter disposed in telescoping engagement with the bore 21 and effective to center the pin 26 therein.

METHOD OF FABRICATION

Figure 3:
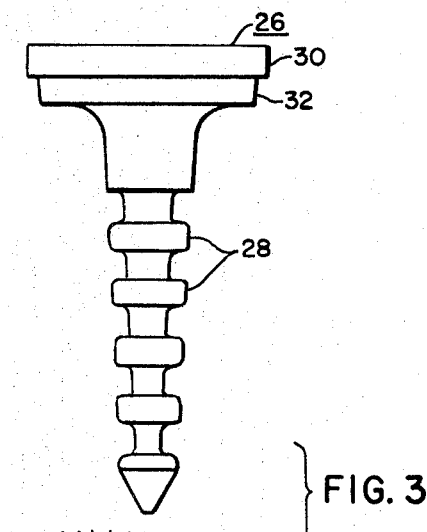
FIG. 3 is a view of the structure shown in FIG. 2, but with the components in exploded relation with each other to show the method of fabrication.

Referring to FIG. 3, wherein the components described above are in "exploded" relation to each other for clarity, the method of fabricating the rope end fitting structure comprises the following steps:

(1) The rope 12 is first threaded through the sleeve member 14, entering at the small diameter end 32 and issuing at the large diameter end 31.

(2) The rope end portion 12a is then unraveled or frayed, so that the fibers are separated in a random manner.

(3) A plotting resin is then applied to the unraveled end portion by dipping into a body of the resin thereby forming a sticky mass of resin and fibers of greater cross-section than the unraveled body of the rope 12.

(4) The thus impregnated fibrous mass is then pulled downwardly in the direction of the arrow 34 into tightly received engagement with the sleeve bore 22.

(5) The tapered pin 26 is subsequently pushed into complete engagement with the resin impregnated fibrous mass, as determined by abutment of the head 30 with the end portion 31 of the sleeve.

(6) The resin is then cured to form a hard coherent mass in which all of the components are intimately and securely bonded to each other.

The rope end fitting structure is especially advantageous when employed with rope made of twisted or braided fibrous material. The fibrous material may be either synthetic or natural. Examples of the natural fibers are sisal, hemp, cotton, flax, etc. Examples of synthetic fibers are nylon, polypropylene, polyethylene terephthalate, etc. The potting resin is preferably epoxy, but other potting resins such as polyester, acrylic and polyurethane may be employed, since these resins cure at normal air temperatures.

By referring again to FIGS. 1 and 2 it will be noted that the sleeve member 14 when anchored to any suitable device (not shown) by the anchoring member 16 is effective to handle the tensile load on the rope 12 (indicated by arrow 36) while subjected to a combination of stresses. More particularly, the frusto-conical inner wall induces "hoop" stresses in the sleeve member due to the wedging action of the embedded resinous and fibrous mass contained therein. The convolutions 24 induce "shear" stresses in the sleeve member due to the interlocking of the resin in the convolutions. The threads 18, on the other hand, are subject to shearing stress. The shearing stress on the threads 18 is transmitted to the sleeve member as a compressive stress, since the pin head 30 is in abutment with the end portion 31 of the sleeve and the pin convolutions 28 are effective to absorb a portion of the tensile load on the rope. The resinous, fibrous mass, on the other hand, is dominantly in compression in view of its convergent shape with its peripheral portions partially in shear in view of the convolutions 24 in the sleeve member.

It will now be seen that the invention provides a highly improved, yet extremely simple, rope end fitting structure that takes advantage of a combination of stresses applied or induced in a highly effective and novel manner to impart optimum strength to all of its components. The structure is so durable and rugged that failure of the rope 12 externally of the fitting structure will occur without damage to the rope end fitting structure, so that the anchoring strength of the rope end fitting structure is limited only by the maximum tensile strength of the rope.

What is claimed is:

1. A rope end fitting structure for supporting a tensile load on the rope, comprising
   a rope formed of fibrous material and having a frayed end portion,
   a tubular sleeve member encompassing said frayed rope end portion,
   said tubular sleeve member having an inner wall surface converging from a diameter larger than the rope diameter in an axial direction opposite to the direction of the tensile force on the rope required to support the load on the rope,
   a potting resin disposed in said sleeve member and having said frayed end portion embedded therein,
   a tapered pin embedded in the frayed rope end portion and maintaining the frayed portion in splayed closely fitting relation with the inner wall of the sleeve member, said potting resin forming a unitary bond between said tapered pin and said sleeve,
   a securing member connected to said sleeve member,
   said sleeve member being provided with an annular shoulder portion and said tapered pin being provided with a disc shaped head portion disposed in abutment with said shoulder portion and effective to transmit a portion of the tensile load on the rope to said securing member by exerting a compressive stress on at least a portion of the sleeve member.

2. The structure recited in claim 1, wherein
   the inner wall surface of the sleeve member is provided with a series of recessed convolutions and the pin is provided with a series of projecting convolutions.

References Cited

UNITED STATES PATENTS

| | | | |
|---|---|---|---|
| 957,492 | 5/1910 | Brown | 24—122.6UX |
| 1,214,709 | 2/1917 | Orr | 24—123.2UX |
| 1,466,127 | 8/1923 | Gottschalt | 24—122.6 |
| 2,249,119 | 7/1941 | Di Palma | 24—123.5UX |
| 2,347,229 | 4/1944 | Woodbury | 24—122.6 |
| 3,263,289 | 8/1966 | Lagarde | 24—123.2UX |
| 3,409,951 | 11/1968 | Morieras | 24—123.2UX |

FOREIGN PATENTS

| | | | |
|---|---|---|---|
| 16,141 | 7/1914 | Great Britain | 221—126.2 |

BERNARD A. GELAK, Primary Examiner

U.S. Cl. X.R.

24—122.6, 126; 287—82